United States Patent
Ge

(10) Patent No.: US 12,045,430 B2
(45) Date of Patent: Jul. 23, 2024

(54) DISPLAY PANEL AND MOBILE TERMINAL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Ru Ge, Shenzhen (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/608,147

(22) PCT Filed: Aug. 3, 2021

(86) PCT No.: PCT/CN2021/110244
§ 371 (c)(1),
(2) Date: Nov. 1, 2021

(87) PCT Pub. No.: WO2023/004842
PCT Pub. Date: Feb. 2, 2023

(65) Prior Publication Data
US 2024/0019974 A1 Jan. 18, 2024

(30) Foreign Application Priority Data
Jul. 27, 2021 (CN) .......................... 202110851282.6

(51) Int. Cl.
*G06F 3/046* (2006.01)
*H04M 1/02* (2006.01)

(52) U.S. Cl.
CPC .......... *G06F 3/046* (2013.01); *H04M 1/0266* (2013.01)

(58) Field of Classification Search
CPC ............................. G06F 3/046; H04M 1/0266
See application file for complete search history.

(56) References Cited

U.S. PATENT DOCUMENTS

| 6,879,299 B1* | 4/2005 | Uen | ........................ | H01Q 7/00 |
| | | | | 343/866 |
| 8,643,618 B2* | 2/2014 | Yu | ........................ | G06F 3/046 |
| | | | | 345/173 |

(Continued)

FOREIGN PATENT DOCUMENTS

| CN | 102419674 A | 4/2012 |
| CN | 203616742 U | 5/2014 |

(Continued)

OTHER PUBLICATIONS

International Search Report in International application No. PCT/CN2021/110244, mailed on Mar. 28, 2022.
Written Opinion of the International Search Authority in International application No. PCT/CN2021/110244, mailed on Mar. 28, 2022.

(Continued)

*Primary Examiner* — Vinh T Lam
(74) *Attorney, Agent, or Firm* — PV IP PC; Wei Te Chung; Zhigang Ma

(57) ABSTRACT

The application discloses a display panel and a mobile terminal. The display panel arranges at least a portion of coil of an electromagnetic antenna in a display area, and wirings of the electromagnetic antenna are arranged in the display area, rather than being arranged in a non-display area similar to a known display device, so that wirings in the non-display area can be avoided to realize a narrow side-frame structure of a mobile terminal.

18 Claims, 7 Drawing Sheets

(56) References Cited

U.S. PATENT DOCUMENTS

| | | | |
|---|---|---|---|
| 9,942,367 B2* | 4/2018 | Lee | G06F 3/0346 |
| 10,326,866 B2* | 6/2019 | Lee | H04B 1/72 |
| 10,838,568 B2* | 11/2020 | Cheng | G06F 3/0416 |
| 11,137,798 B2* | 10/2021 | Ju | G06F 1/182 |
| 11,276,365 B2* | 3/2022 | Binboga | G09G 5/006 |
| 11,315,465 B2* | 4/2022 | Jung | H01Q 13/10 |
| 11,527,814 B2* | 12/2022 | Han | H01Q 1/243 |
| 11,594,818 B2* | 2/2023 | Park | H01Q 7/00 |
| 2014/0218638 A1 | 8/2014 | Kang et al. | |
| 2014/0247547 A1* | 9/2014 | Jung | H02J 50/70 |
| | | | 361/679.26 |
| 2017/0177122 A1* | 6/2017 | Jiang | G06F 3/04164 |
| 2020/0135140 A1* | 4/2020 | Binboga | G06F 3/147 |
| 2020/0235477 A1 | 7/2020 | Yamamoto et al. | |
| 2020/0342802 A1 | 10/2020 | Zou et al. | |

FOREIGN PATENT DOCUMENTS

| | | |
|---|---|---|
| CN | 103941952 A | 7/2014 |
| CN | 104484086 A | 4/2015 |
| CN | 105359066 A | 2/2016 |
| CN | 105739806 A | 7/2016 |
| CN | 108445686 A | 8/2018 |
| CN | 108508640 A | 9/2018 |
| CN | 110580118 A | 12/2019 |
| CN | 111240523 A | 6/2020 |
| JP | 2006284932 A | 10/2006 |

OTHER PUBLICATIONS

Chinese Office Action issued in corresponding Chinese Patent Application No. 202110851282.6 dated Jan. 12, 2024, pp. 1-6.

* cited by examiner

DISPLAY PANEL AND MOBILE TERMINAL

FIELD OF INVENTION

The present invention relates to display technologies, and more particularly, to a display panel and a mobile terminal including the display panel.

BACKGROUND OF INVENTION

An integrated electromagnetic antenna coil inside a display device allows for realization of a function of handwriting input. FIG. 1 is a structural diagram of a known display screen 100a. The display screen 100a comprises a substrate 110 and a circuit board 120 arranged outside the substrate 110. The substrate 110 comprises a display area 111 and a non-display area 112. A display signal drive circuit 114 and multiple flexible circuit boards 113 are arranged in the non-display area 112. The display area 111 of the substrate 110 is connected by means of the flexible circuit boards 113 to the circuit board 120. An electromagnetic antenna coil 130a inside the known display screen 100a is commonly a comb-like antenna. Referring to FIG. 1, the electromagnetic antenna coil 130a includes an induction coil 131a located in the display area 111, and signal wirings 132a of the electromagnetic antenna coil 130a are arranged in the non-display area 112 that is outside the display area 11. To ensure the circuit impedance of the electromagnetic antenna coil 130a meets the specification, it is necessary that the signal wirings 132a to have a relatively large width, and this results in the display screen 100a having a relatively wide side-frame.

SUMMARY OF INVENTION

The disclosure provides a display panel and a mobile terminal, which help resolve the issue that a side-frame of the known display panel is relatively wide.

An embodiment of the disclosure provides a display panel, comprising a substrate, the substrate comprising a display area and a non-display area surrounding the display area; the display panel further comprising: multiple electromagnetic antennas, which are arranged on the substrate, the electromagnetic antennas comprising a coil and wirings connected to the coil, at least a portion of the coil being located in the display area, at least a portion of the wirings being located in the display area, the wirings having one end connected to the coil located in the display area, the wirings having another end extended to the non-display area.

Further, the wirings of one electromagnetic antenna correspond to and are connected to one flexible circuit board arranged in the non-display area.

Further, the wirings are arranged in a first direction, and multiple ones of the wirings are distributed, as being parallel to and spaced from each other, in a second direction; or alternatively, the wirings are arranged in the second direction, and multiple ones of the wirings are distributed, as being parallel to and spaced from each other, in the first direction; and the first direction and the second direction are perpendicular to each other.

Further, the wirings of a portion of the electromagnetic antennas are arranged in the first direction and are distributed, as being parallel to and spaced from each other, in the second direction, and the wirings of another portion of the electromagnetic antennas are arranged in the second direction and are distributed, as being parallel to and spaced from each other, in the first direction.

Further, the wirings have lengths that are reduced successively in the second direction.

Further, a opening is opened in the coils located in the display area, and the coil corresponding to an end of the opening is provided with a first wiring connection end, while the coil corresponding to another end of the opening is provided with a second wiring connection end, the first wiring connection end and the second wiring connection end being each connected to one wiring, the two wirings being arranged parallel to and spaced from each other.

Further, the coil is formed of two first line segments and two second line segments in the form of a quadrilateral shape, the first line segments and the second line segments being sequentially connected in an end-to-end manner, the first line segments being arranged in the first direction, the second line segments being arranged in the second direction.

Further, at least one of the first segments of the coil is located in the display area, and/or at least one of the second segments of the coil is located in the display area; and the opening of the coil is opened in the first line segment that is located in the display area, or the opening of the coil is opened in the second line segment that is located in the display area.

Further, the display area comprises pixel units arranged therein in an array, the wirings of one electromagnetic antenna being arranged between two adjacent rows of the pixel units, and/or the wirings of one electromagnetic antenna being arranged between two adjacent columns of the pixel units; and the opening is opened in the coil that corresponds to intersection between a row-wise direction and a column-wise direction.

To achieve the above objective, the present invention also provides a mobile terminal. The mobile terminal comprises a terminal main body and the display panel described above. The terminal main body is combined with the display panel as one piece.

The beneficial effect of the present disclosure is that: at least a portion of coil of an electromagnetic antenna is arranged in a display area, and the wirings of the electromagnetic antenna are arranged in the display area, rather than being arranged in a non-display area similar to a known display device, so that wirings in the non-display area can be avoided to realize a narrow side-frame structure of a mobile terminal.

DESCRIPTION OF DRAWINGS

The technical solution of the disclosure, and beneficial advantages thereof, will become apparent by means of a detailed description of embodiments of the disclosure, with reference to the attached drawings.

LISTING OF REFERENCE NUMERALS

100*a*: display screen, 130*a*: induction coil, 132*a*: signal wiring; 100: display panel, 110: substrate, 111: display area, 112: non-display area, 113: flexible circuit board, 114: display signal drive circuit, 120: circuit board, 130: electromagnetic antenna, 131: coil, 1311: first line segment, 1312: second line segment, 132: wiring, 133: port, 141: scan line, 142: data line, 150: pixel array, 151: pixel unit; Y: first direction; X: second direction

DETAILED DESCRIPTION OF PREFERRED EMBODIMENTS

A clear and complete description of a technical solution of an embodiment of the present invention will be provided below with reference to the drawings of the embodiment of the present invention. However, the described embodiment covers only some of the embodiments, but not all of the embodiments, of the present invention. Other embodiments that can be contemplated by skilled artisans of the technical field, without paying creative endeavor, based on the embodiments of the present invention are considered belonging to the scope of protection that the present invention seeks for.

Wirings in a non-display area can be avoided in a display panel by arranging at least a portion of a coil of an electromagnetic antenna in a display area and arranging wirings of the electromagnetic antenna in the display area, rather than being arranged in the non-display area as being adopted in the known display device, and a narrow side-frame structure of a mobile terminal can thus be realized. As a typical application, the display panel of the present invention is applied to a mobile terminal, such as a mobile terminal having a function of hand-writing input.

Figure 1:
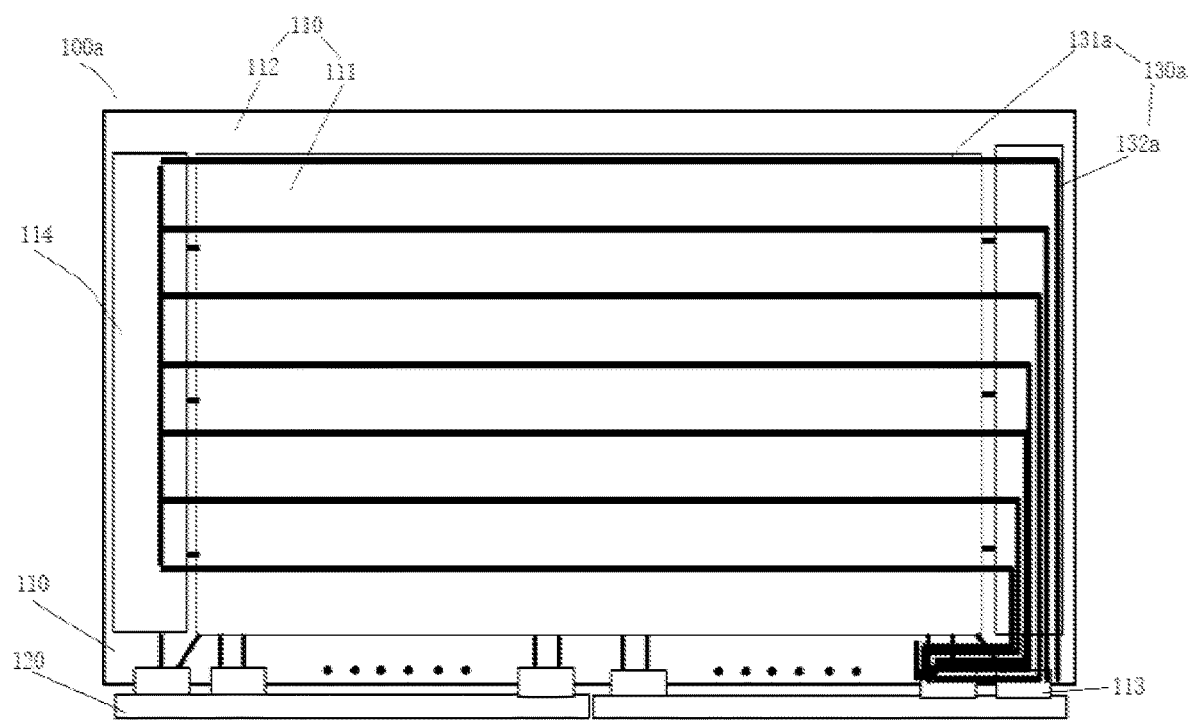
FIG. 1 is a schematic structural diagram of a known display device.
Figure 2:
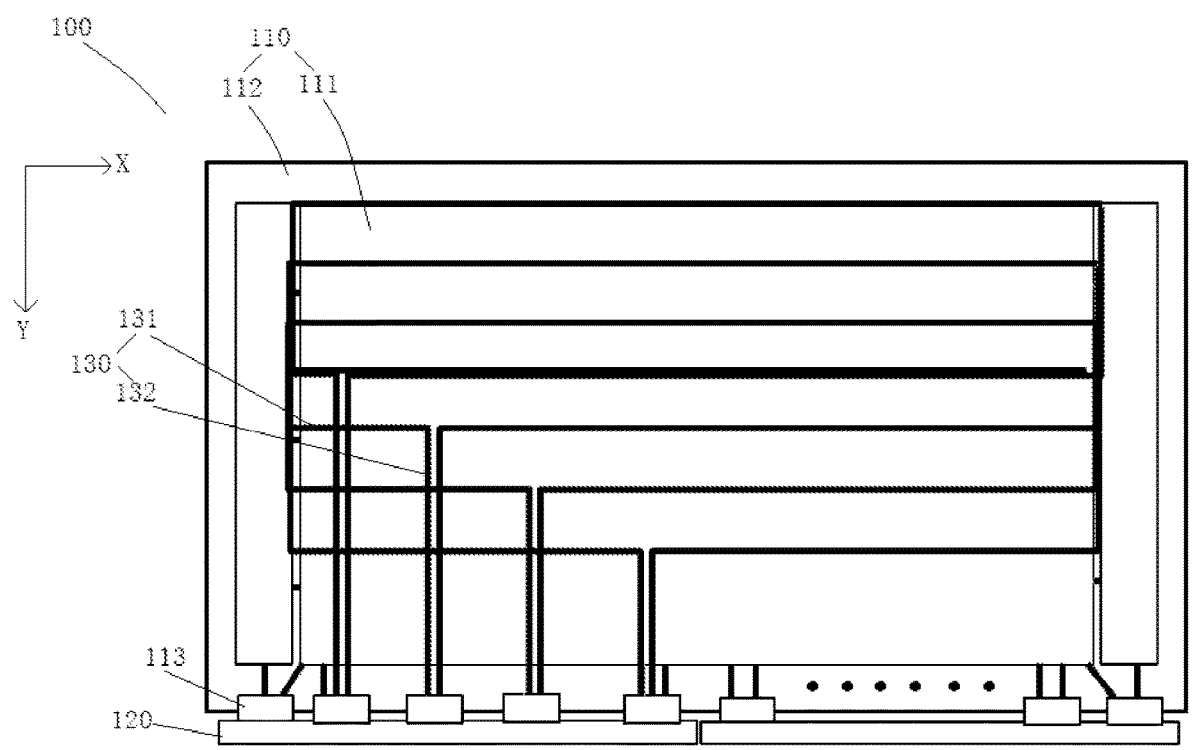
FIG. 2 is a schematic structural diagram of a display panel provided in an illustrative embodiment of the disclosure.

In an embodiment of the present invention, referring to FIG. 2, a display panel 100 comprises a substrate 110 and a circuit board 120. The substrate 110 defines a display area 111 and a non-display area 112 surrounding the display area 111. Multiple flexible circuit boards 113 are arranged in the non-display area 112 that is located outside the display area 111. The flexible circuit boards 113 are connected to the circuit board 120. Each of the flexible circuit boards 113 is provided with a drive chip (not shown in the drawings) integrated thereon. The display panel 100 further comprises multiple electromagnetic antennas 130. The electromagnetic antennas 130 comprise a coil 131 and wirings 132. At least a portion of the coil 131 is located in the display area 111, and at least a portion of the wirings 132 is located in the display area 111. The wirings 132 have one end connected to the coil 131 located in the display area, and the wirings 132 have another end extended to the non-display area 112 to connect to the flexible circuit boards 113. The coil 131 is connected by the wirings 132 to the flexible circuit boards 113 to form a circuit loop. The multiple coils 131 form an electromagnetic induction layer in the display area 111 of the display panel 100. When electromagnetic stylus (not shown in the drawings) is operated to perform the hand-writing input, a resonance circuit is included in the electromagnetic stylus and the electromagnetic stylus is movable on the display area 111 of the display panel 100, so that the resonance circuit included in the electromagnetic stylus is excited by an electromagnetic wave transmitted from the electromagnetic antennas 130 to give off an electromagnetic signal, and the electromagnetic antenna 130, in response to the electromagnetic signal received thereby, generates an induction current that is transmitted to the drive chip inside the flexible circuit board 113, and the drive chip determines, according to the induction current received thereby, a position of the electromagnetic stylus touching the display area 111 to thereby realize hand-writing input.

In the device, the drive chip comprises a chip-on-film (COF) and the drive chip that is connected to the wirings 132 is also connected to data lines 142 included in the display area 111.

In the instant embodiment, a majority of the wirings 132 is located in the display area 111, namely being laid and arranged within the display area 111, and only a minority of the wirings 132 is in the non-display area 112 for connecting the coil 131 and the flexible circuit boards 113. There is no need for the wirings 132 to be laid in a manner of being first routed to the non-display area 112 outside the display area 111 to be then connected to the flexible circuit boards 113, so that a width of a side-frame can be effectively reduced for realization of a narrow side-frame. Further, since wiring laying is not necessarily routed to the non-display area 112 outside the display area 111, there is no need to increase thickness of the wirings 132. In the device, the wirings 132 of one of the electromagnetic antennas 130 correspond to one of the flexible circuit boards 113, so that the wirings 132 can be laid in the form of straight lines, without any curving for achieving connection with the flexible circuit board 113.

In the instant embodiment, referring to FIG. 2, the wirings 132 are arranged in the first direction Y. The wirings 132 of the multiple electromagnetic antennas 130 are arranged to distribute, as being spaced from each other, in the second direction X, and the wirings 132 of the multiple electromagnetic antenna 130 have lengths that are successively reduced in the second direction X to form a stepwise arrangement. The first direction Y and the second direction X are perpendicular to each other.

Figure 3:
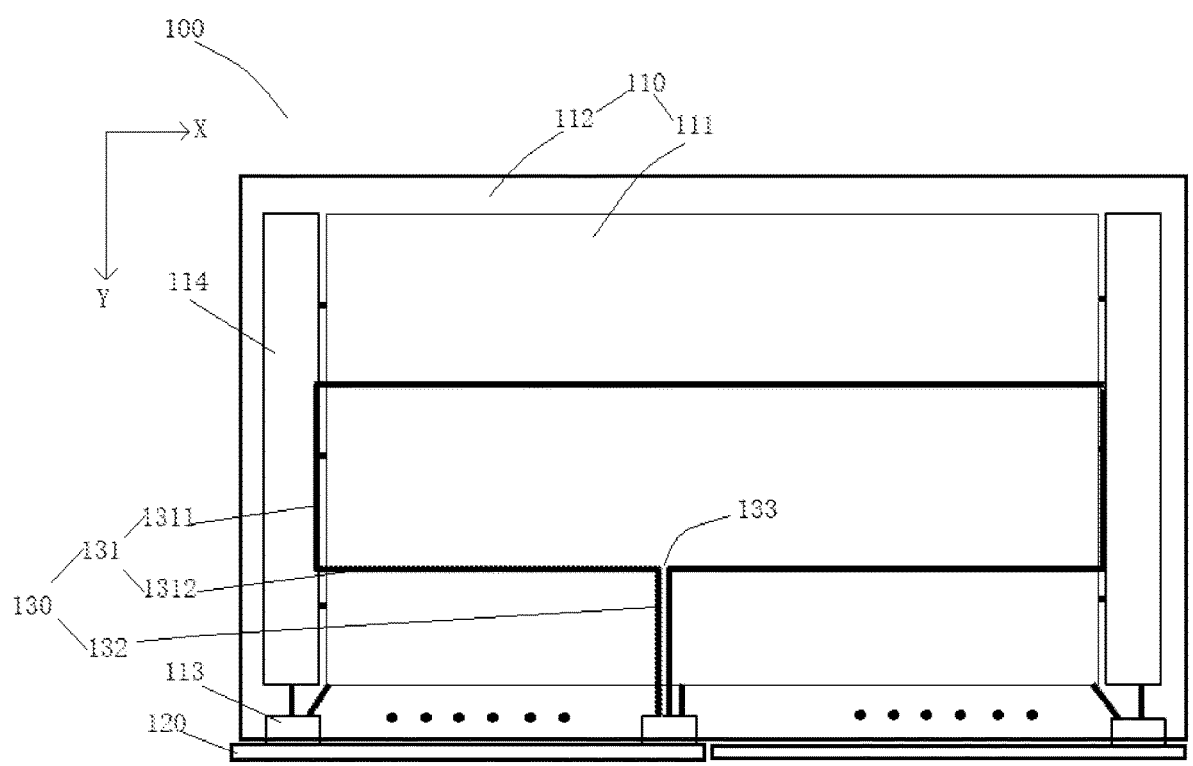
FIG. 3 is a schematic structural diagram of a layout of an electromagnetic antenna of a display panel provided in another illustrative embodiment of the present invention.

In the instant embodiment, referring to FIG. 3, the coils 131 that are located in the display area 111 are provided with a opening 133. The coil 131 that corresponds to an end of the opening 133 is provided with a first wiring connection end, and the coil 131 corresponding to an opposite end of the opening 133 is provided with a second wiring connection end. The first wiring connection end and the second wiring connection end are each connected to one wiring 132, and the two wirings 132 are arranged parallel to and space from each other, namely the coil 131 of one electromagnetic antenna 130 is connected to two wirings 132, and ends of the two wirings 132 that are distant from the coil 131 are connected to the flexible circuit boards 113 to form a circuit loop.

In the instant embodiment, referring to FIG. 3, the coil 131 is formed of two first line segments 1311 and two second line segments 1312 to form a quadrilateral shape. The first line segments 1311 are arranged in the first direction Y, and the second line segments 1312 are arranged in the second direction X. The first line segments 1311 and the second line segments 1312 are sequentially connected in an end-to-end manner. The second line segments 1312 of the coil 131 are located in the display area 111, and the opening 133 is opened in one of the second line segments 1312 located in the display area 111.

Figure 4:
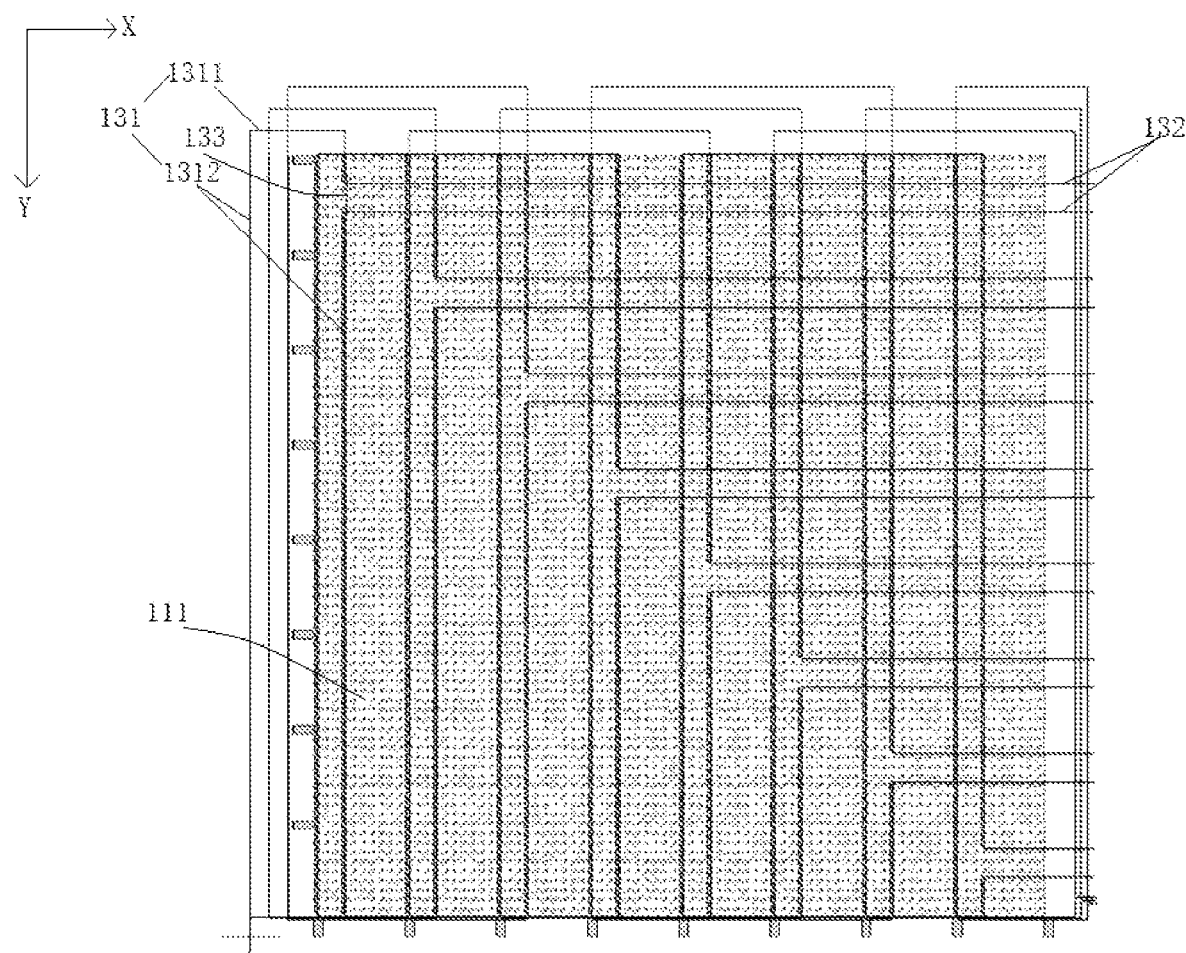
FIG. 4 is a schematic structural diagram of a layout of an electromagnetic antenna of a display panel provided in another illustrative embodiment of the present invention.

In another embodiment of the present invention, referring to FIG. 4, at least one of the second line segments 1312 of the coil 131 is located in the display area 111, and the two first line segments 1311 of the coil 131 are located in the non-display area 112, or alternatively, one of the first line segments 1311 of the coil 131 is located in the display area 111, while another one of the first line segments 1311 is located in the non-display area 112. In the instant embodiment, at least one of the second line segments 1312 of the coil 131 is at least partly located in the display area 111, and a remaining portion of the one the second line segment 1312 is located in the non-display area 112, and the opening 133 is opened in the second line segment 1312 that is located in the display area 111.

In the instant embodiment, referring to FIG. 4, the wirings 132 are arranged in the second direction X, and the wirings 132 of the multiple electromagnetic antennas 130 are distributed, as being parallel to and spaced from each other, in the first direction Y. In the instant embodiment, the wirings 132 of the multiple electromagnetic antennas 130 have lengths that are successively reduced in the first direction Y to form a stepwise arrangement.

Figure 5:
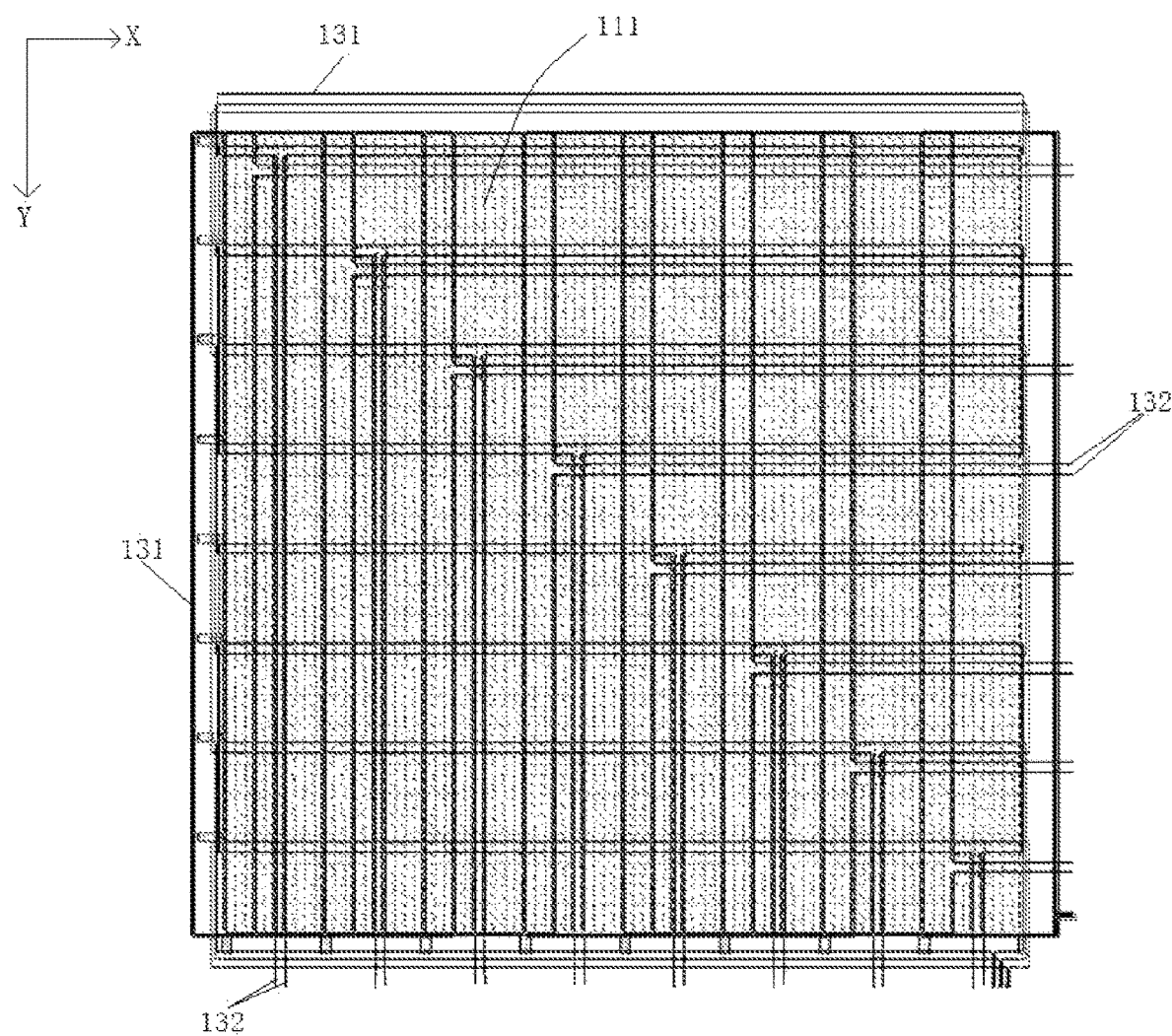
FIG. 5 is a schematic structural diagram of a layout of an electromagnetic antenna of a display panel provided in another illustrative embodiment of the present invention.

In a further embodiment of the present invention, referring to FIG. 5, the wirings 132 of a portion of the electromagnetic antennas 130 are arranged in the first direction Y and are distributed, as being parallel to and spaced from each other, in the second direction X, the wirings 132 of multiple electromagnetic antennas 130 of this portion having lengths that are successively reduced in the second direction X; the wirings 132 of another portion of the electromagnetic antennas 130 are arranged in the second direction X and are distributed, as being parallel to and spaced from each other, in the first direction Y, the wirings 132 of multiple electromagnetic antennas 130 of this portion having lengths that are successively reduced in the first direction Y. Thus, an arrangement of the wirings 132 intersecting longitudinally and laterally in the display area 111 is formed.

Figure 6:
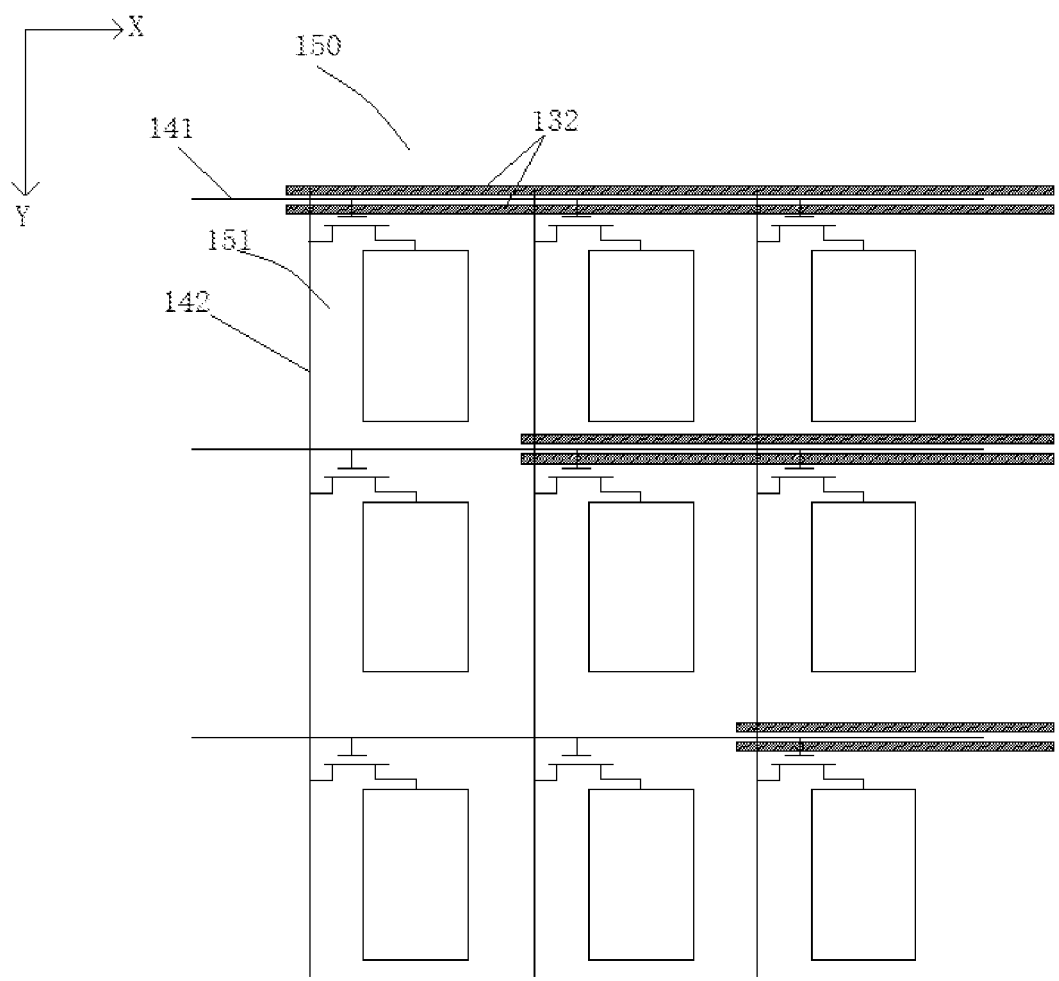
FIG. 6 is a schematic structural diagram of a layout of wirings of an electromagnetic antenna in a pixel array of a display panel provided in another illustrative embodiment of the present invention.

In yet a further embodiment of the present invention, referring to FIG. 6, the wirings 132 are arranged parallel to wires (scan lines 141) within the display area 111 of the substrate 110. A display signal drive circuit 114 is arranged in the non-display area 112 of the substrate 110. An input end of the display signal drive circuit 114 is connected to the flexible circuit boards 113, and an output end of the display signal drive circuit 114 is connected to the scan lines 141. The scan lines 141 and data lines 142 define multiple pixel units 151 in the display area 111 of the substrate 110. The multiple pixel units 151 form a pixel array 150. In the instant embodiment, the wirings 132 of one electromagnetic antenna 130 are arranged between two adjacent rows of the pixel units 151, namely the wirings 132 are parallel to the scan lines 141, with one scan line 141 corresponding to the wirings 132 of one electromagnetic antenna 130. In the instant embodiment, the number of wirings 132 connected to the coil 131 of one electromagnetic antenna 130 is two.

In the instant embodiment, the opening 133 of the coils 131 of the electromagnetic antennas 130 is opened in the coil 131 that corresponds to intersection between a row-wise direction (namely the second direction X) and a column-wise direction (namely the first direction Y), meaning the connection between the coil 131 and the wirings 132 is located at the intersection between the row-wise direction and the column-wise direction, rather than being located between two adjacent rows of pixel units or two adjacent columns of pixel units, in order to reduce or even eliminate signal interference.

Figure 7:
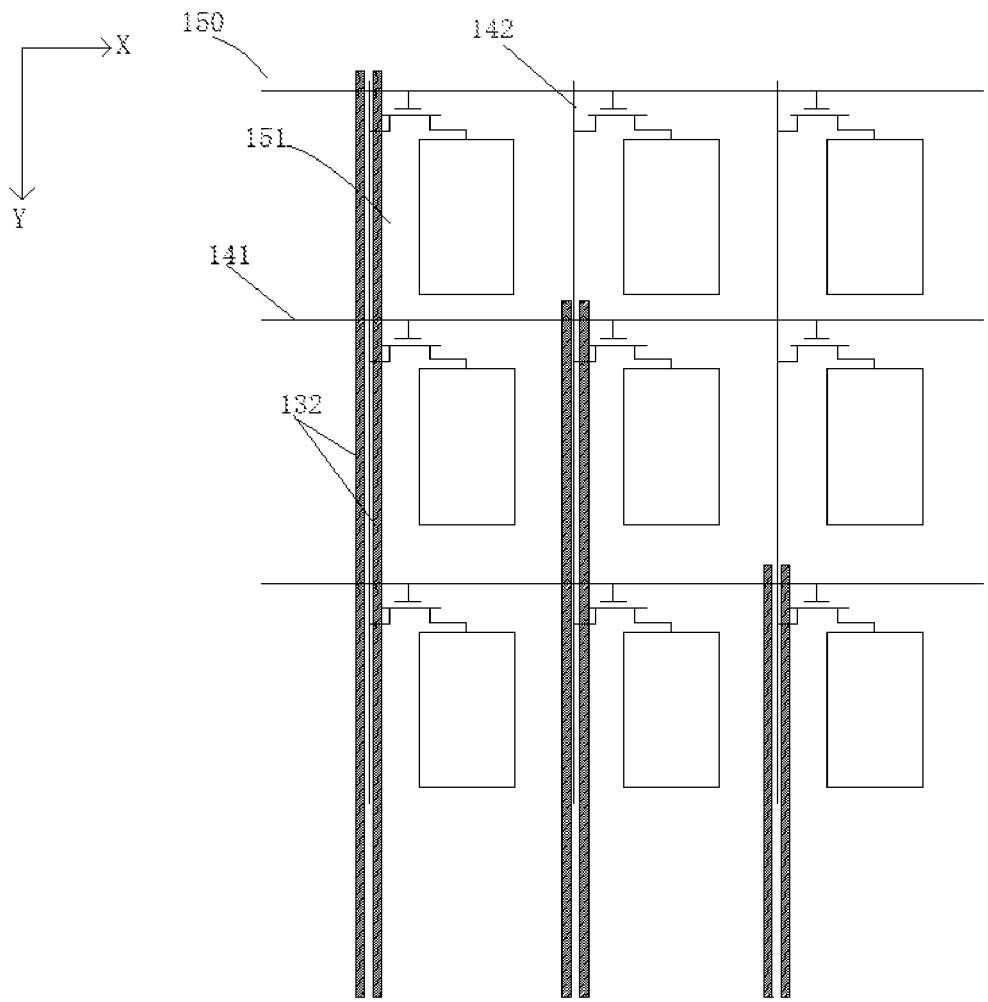
FIG. 7 is a schematic structural diagram of a layout of wirings of an electromagnetic antenna in a pixel array of a display panel provided in another illustrative embodiment of the present invention.

In another embodiment, referring to FIG. 7, the wirings 132 are arranged parallel to wires (data lines 142) within the display area 111 of the substrate 110. The wirings 32 of one electromagnetic antenna 130 are arranged between two adjacent columns of the pixel units 151, namely the wirings 132 are parallel to the data lines 142, with one the data line 142 corresponding to the wirings 132 of one electromagnetic antenna 130. In the instant embodiment, the number of wirings 132 connected to the coil 131 of one electromagnetic antenna 130 is two. In the instant embodiment, the opening 133 of the coils 131 of the electromagnetic antennas 130 is opened in the coil 131 that corresponds to intersection between a row-wise direction (namely the second direction X) and a column-wise direction (namely the first direction Y), meaning the connection between the coil 131 and the wirings 132 is located at the intersection between the row-wise direction and the column-wise direction.

In a further embodiment of the present invention, the wirings 132 of a portion of the electromagnetic antennas 130 are arranged in the pixel array 150 in the row-wise direction (namely the second direction X), with two wirings 132 of one electromagnetic antenna 130 being arranged in two adjacent rows of the pixel units 151, while the wirings 132 of another portion of the electromagnetic antennas 130 are arranged in the pixel array 150 in the column-wise direction (namely the first direction Y, with two wirings 132 of one electromagnetic antenna 130 arranged between two adjacent columns of the pixel units 151. In the instant embodiment, the opening 133 of the coils 131 of the electromagnetic antennas 130 is opened in the coil 131 that corresponds to intersection between the row-wise direction (namely the second direction X) and the column-wise direction (namely the first direction Y), meaning the connection between the coil 131 and the wirings 132 is located at the intersection between the row-wise direction and the column-wise direction.

In summary, although the disclosure has been disclosed above with reference to preferred embodiments, the preferred embodiment provided above are not intended to constrain the disclosure. Those having ordinary skill in the field may contemplate various alterations and modifications without departing from the sprits and scope of the disclosure, and thus, the scope of protection for the disclosure is only defined by the scope of the claims.

What is claimed is:

1. A display panel, comprising a substrate, wherein the substrate comprises a display area and a non-display area surrounding the display area; and
   wherein the display panel further comprises:
   a plurality of electromagnetic antennas disposed on the substrate, wherein the electromagnetic antennas comprise respective coils and respective wirings each of which is connected to a corresponding one of the coils, at least a portion of the coil is located in the display area, at least a portion of the wiring is located in the display area, one end of the wiring is connected to the coil located in the display area, and another end of the wiring extends to the non-display area;
   wherein the wiring of each of the electromagnetic antennas corresponds to and is connected to a corresponding one of flexible circuit boards arranged in the non-display area; and the flexible circuit boards are spaced apart.

2. The display panel according to claim 1, wherein the wirings are arranged in a first direction, and the wirings are distributed parallel to and spaced from each other in a second direction, or alternatively, the wirings are arranged in the second direction, and the wirings are distributed parallel to and spaced from each other in the first direction, and wherein the first direction and the second direction are perpendicular to each other.

3. The display panel according to claim 2, wherein the wirings of some of the electromagnetic antennas are arranged in the first direction and are distributed parallel to and spaced from each other in the second direction, and the wirings of another ones of the electromagnetic antennas are arranged in the second direction and are distributed parallel to and spaced from each other in the first direction.

4. The display panel according to claim 3, wherein lengths of the wirings are reduced successively in the second direction.

5. The display panel according to claim 1, wherein the coils located in the display area are provided with openings, and one end of each of the coils corresponding to a corresponding one of the openings is provided with a first wiring connection end, another end of the coil corresponding to the opening is provided with a second wiring connection end, the first wiring connection end and the second wiring connection end are each connected to one of the wirings, and the wiring connected to the first wiring connection end is arranged parallel to and spaced from the wiring connected to the second wiring connection end.

6. The display panel according to claim 5, wherein the coil has a quadrilateral shape formed by two first line segments and two second line segments, the two first line segments and the two second line segments are sequentially connected in an end-to-end manner, the two first line segments are arranged in the first direction, and the two second line segments are arranged in the second direction.

7. The display panel according to claim 6, wherein at least one of the two first line segments of the coil is located in the display area, and the opening of the coil is provided at the at least one first line segment located in the display area.

8. The display panel according to claim 6, wherein at least one of the two second line segments of the coil is located in the display area, and the opening of the coil is provided at the at least one second line segment located in the display area.

9. The display panel according to claim 8, wherein pixel units are provided in an array in the display area, the wiring of one of the electromagnetic antennas is arranged between two adjacent rows of the pixel units, and/or the wiring of one of the electromagnetic antennas is arranged between two adjacent columns of the pixel units, and wherein the opening is provided in the coil corresponding to an intersection of a row-wise direction and a column-wise direction.

10. A mobile terminal, wherein the mobile terminal comprises a terminal main body and a display panel, and the terminal main body is combined with the display panel as one niece:
wherein the display panel comprises a substrate, and the substrate comprises a display area and a non-display area surrounding the display area; and
wherein the display panel further comprises:
a plurality of electromagnetic antennas disposed on the substrate, the electromagnetic antennas comprise respective coils and respective wirings each of which is connected to a corresponding one of the coils, at least a portion of the coil is located in the display area, at least a portion of the wiring is located in the display area, one end of the wiring is connected to the coil located in the display area, and another end of the wiring extends to the non-display area;
wherein the wiring of each of the electromagnetic antennas corresponds to and is connected to a corresponding one of flexible circuit boards arranged in the non-display area; and the flexible circuit boards are spaced apart.

11. The mobile terminal according to claim 10, wherein the wirings are arranged in a first direction, and the wirings are distributed parallel to and spaced from each other in a second direction, or alternatively, the wirings are arranged in the second direction, and the wirings are distributed parallel to and spaced from each other in the first direction, and wherein the first direction and the second direction are perpendicular to each other.

12. The mobile terminal according to claim 11, wherein the wirings of some of the electromagnetic antennas are arranged in the first direction and are distributed parallel to and spaced from each other in the second direction, and the wirings of another ones of the electromagnetic antennas are arranged in the second direction and are distributed parallel to and spaced from each other, in the first direction.

13. The mobile terminal according to claim 10, wherein the coils located in the display area are provided with openings, and one end of each of the coils corresponding to a corresponding one of the openings is provided with a first wiring connection end, another end of the coil corresponding to the opening is provided with a second wiring connection end, the first wiring connection end and the second wiring connection end are each connected to one of the wirings, and the wiring connected to the first wiring connection end is arranged parallel to and spaced from the wiring connected to the second wiring connection end.

14. The mobile terminal according to claim 13, wherein the coil has a quadrilateral shape formed by two first line segments and two second line segments, the two first line segments and the two second line segments are sequentially connected in an end-to-end manner, the two first line segments are arranged in the first direction, and the two second line segments are arranged in the second direction.

15. The mobile terminal according to claim 14, wherein at least one of the two first line segments of the coil is located in the display area, and the opening of the coil is provided at the at least one first line segment located in the display area.

16. The mobile terminal according to claim 14, wherein at least one of the two second line segments of the coil is located in the display area, and the opening of the coil is provided at the at least one second line segment located in the display area.

17. The mobile terminal according to claim 16, wherein pixel units are provided in an array in the display area, the wiring of one of the electromagnetic antennas is arranged between two adjacent rows of the pixel units, and/or the wiring of one of the electromagnetic antennas is arranged between two adjacent columns of the pixel units, and wherein the opening is provided in the coil corresponding to an intersection between a row-wise direction and a column-wise direction.

18. A mobile terminal, wherein the mobile terminal comprises a terminal main body and a display panel, and the terminal main body is combined with the display panel as one piece;
wherein the display panel comprises a substrate, and the substrate comprises a display area and a non-display area surrounding the display area; and wherein the display panel further comprises:
a plurality of electromagnetic antennas disposed on the substrate, the electromagnetic antennas comprise respective coils and respective wirings each of which is connected to a corresponding one of the coils, at least a portion of the coil is located in the display area, at least a portion of the wiring is located in the display area, one end of the wiring is connected to the coil located in the display area, and another end of the wiring extends to the non-display area;
the wirings are arranged in a first direction, and the wirings are distributed parallel to and spaced from each other in a second direction, or alternatively, the wirings are arranged in the second direction, and the wirings are distributed parallel to and spaced from each other in the first direction, and wherein the first direction and the second direction are perpendicular to each other;
the wirings of some of the electromagnetic antennas are arranged in the first direction and are distributed parallel to and spaced from each other in the second direction, and the wirings of another ones of the electromagnetic antennas are arranged in the second direction and are distributed parallel to and spaced from each other, in the first direction;
wherein lengths of the wirings are reduced successively in the second direction.

* * * * *